United States Patent [19]

Itakura

[11] Patent Number: 5,977,868
[45] Date of Patent: *Nov. 2, 1999

[54] INSTRUMENTATION FOR VEHICLE

[76] Inventor: Tsuyoshi Itakura, 3 16 12 706, Nagayoshikawanabe, Hirano-ku, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/008,409

[22] Filed: Jan. 17, 1998

[51] Int. Cl.$^6$ ..................................... B60Q 1/00
[52] U.S. Cl. ................ 340/438; 340/461; 340/815.4; 116/284; 116/288
[58] Field of Search ............. 340/815.4, 815.41, 340/815.43, 815.47, 669, 670, 671, 980; 296/70; 180/90; 116/284, 288, 286, DIG. 6, DIG. 36

[56] References Cited

U.S. PATENT DOCUMENTS

| | | | |
|---|---|---|---|
| 3,800,135 | 3/1974 | Ramsey | 362/32 |
| 3,896,791 | 7/1975 | Ono | 600/493 |
| 3,950,700 | 4/1976 | Weisbart | 340/670 |
| 4,223,553 | 9/1980 | Fiala | 73/115 |
| 4,308,527 | 12/1981 | Moreau et al. | 340/815.4 |
| 4,562,433 | 12/1985 | Biferno | 345/4 |
| 4,567,082 | 1/1986 | Tabata et al. | 428/138 |
| 4,756,603 | 7/1988 | Ohtani | 359/601 |
| 4,878,453 | 11/1989 | Inoue et al. | 116/288 |
| 5,272,463 | 12/1993 | Furuya et al. | 340/438 |
| 5,578,985 | 11/1996 | Cremers et al. | 340/461 |

Primary Examiner—Jeffery A. Hofsass
Assistant Examiner—Van T. Trieu
Attorney, Agent, or Firm—Moonray Kojima

[57] ABSTRACT

A vehicle instrument display disposed in a panel in front of a driver's seat, wherein at least one scale plate of a plurality of instrument display devices is made of a colored or colorless transparent or transluscent material, whereby the internal mechanism of the display devices can be readily observed.

8 Claims, 7 Drawing Sheets

INSTRUMENTATION FOR VEHICLE

BACKGROUND OF THE INVENTION

1. Field of the Invention

The present invention relates to an instrumentation for vehicle disposed in an instrument panel before the driver's seat.

2. Description of the Prior Art

Hitherto, the instrumentation for vehicle disposed in the instrument panel before the driver's seat included necessary plural instruments depending on the model and grade of the vehicle, selected from the tachometer, speedometer, oil pressure gauge, fuel meter, turbo boost meter, water temperature meter, odometer, trip meter, etc.

In the conventional instrumentation for vehicle, however, since scale plates of all instruments are made of opaque materials, the internal structure of the instrument cannot be inspected through the scale plate, and the working state, deterioration or heat generation of the internal structure of the instrument cannot be visually recognized, and hence in case of trouble of the instrument, it took time to find out the defective point.

SUMMARY OF THE INVENTION

It is hence a primary object of the invention to present an instrumentation for vehicle having at least one scale plate of the scale plates of plural instruments composed of transparent or translucent material, so as to be capable of inspecting the internal structure of the instrument through the scale plate, visually recognizing the working state, deterioration or heat generation of the internal structure of the instrument, finding out easily the defective point in case of trouble of the instrument, improving the design, enhancing the countermeasure to prevent reversing of meter (prevent illegal alteration), and evoking the driving sense of driving a high-tech vehicle for the driver.

It is other object of the invention to present an instrumentation for vehicle having at least one scale plate of the scale plates of plural instruments composed of opaque, transparent or translucent material selectively, so as to be capable of arbitrarily exchanging selectively these scale plates according to the needs of the driver, enhancing the degree of freedom of selection of scale plates, and, when the transparent or translucent scale plate is selected, inspecting the internal structure of the instrument through this scale plate, visually recognizing the working state, deterioration or heat generation of the internal structure of the instrument, and finding out easily the defective point in case of trouble of the instrument.

It is a different object of the invention to present an instrumentation for vehicle having transparent or translucent scale plates of various colors and attaching a scale plate of a specific color by selecting from these color scale plates, so as to be capable of changing the color of the scale plate depending on the sense, taste or needs of the driver.

It is other different object of the invention to present an instrumentation for vehicle having lamp covers made of transparent or translucent material, so as to be capable of visually recognizing the internal structure of lamp cover, and improving the design.

It is a still different object of the invention to present an instrumentation for vehicle having luminous electric decorative means (for example, neon tubes) in an extra space of the instrumentation, so as to be capable of keeping electric decorative effects.

Further objects of the invention will be better appreciated from the following detailed description of the embodiments.

DESCRIPTION OF THE PREFERRED EMBODIMENTS

Figure 1:
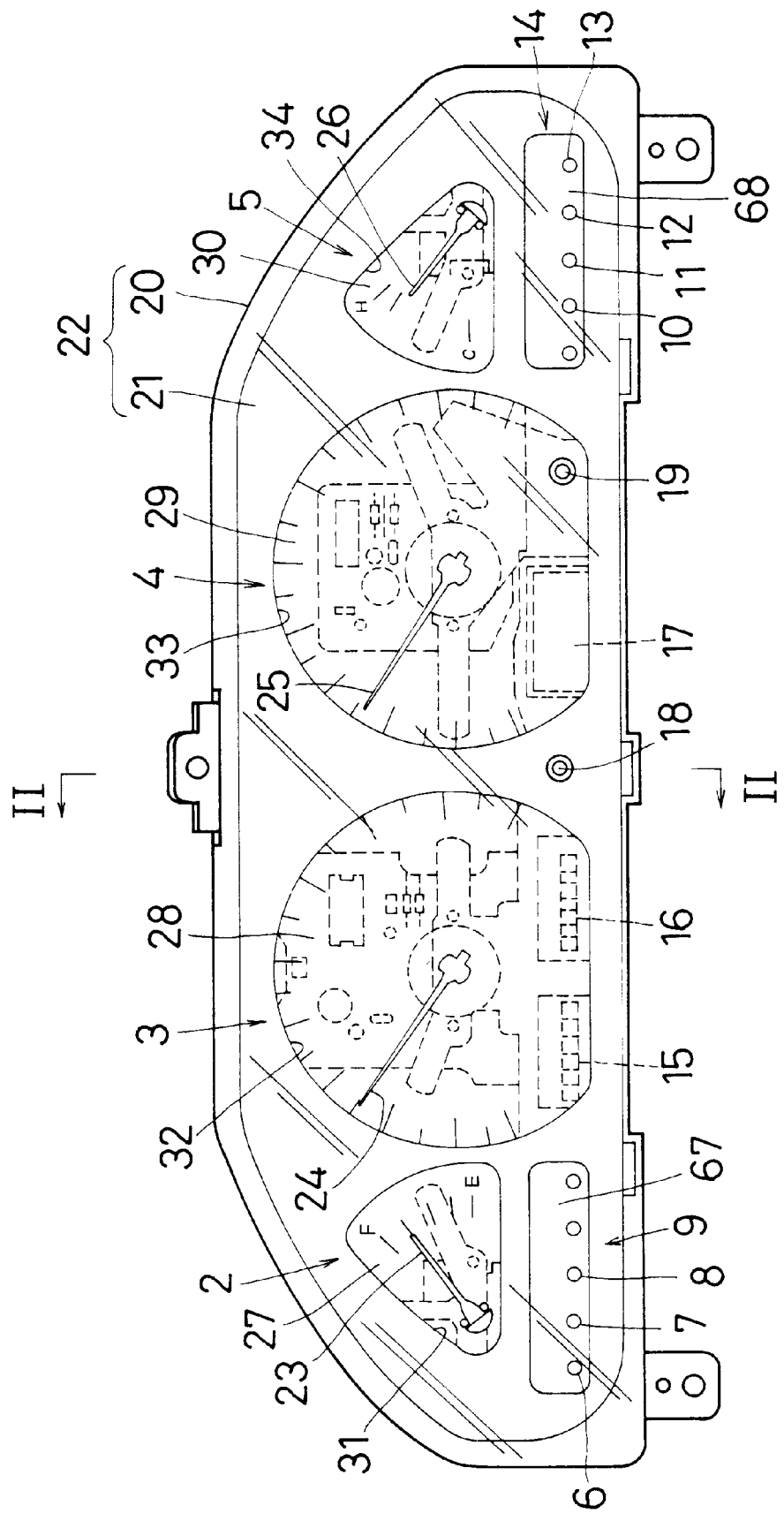
FIG. 1 is a front view showing an instrumentation for vehicle of the invention.

Referring now to the drawings, preferred embodiments of the invention are described in detail below.

Figure 2:
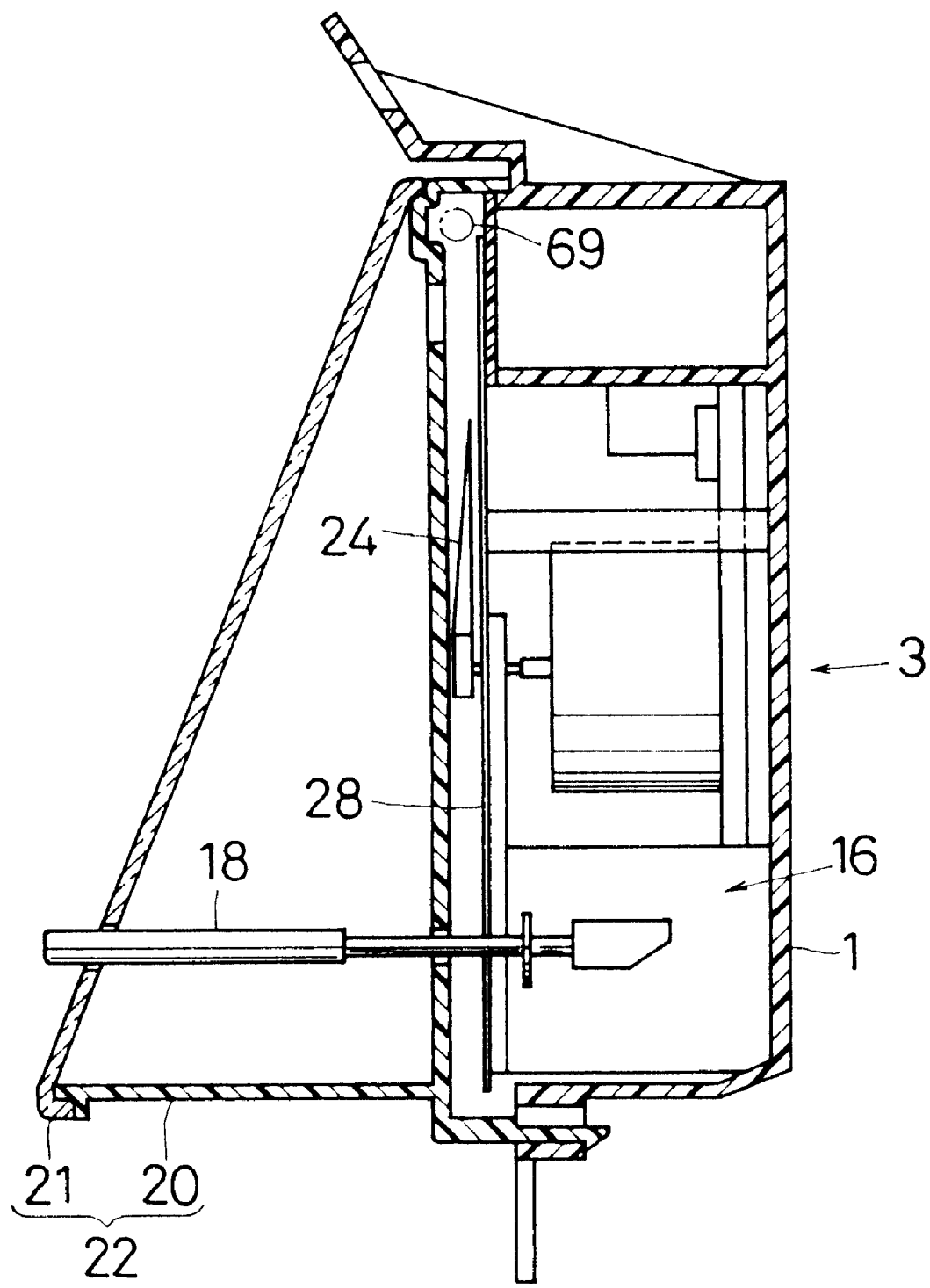
FIG. 2 is a sectional arrow view of II—II in FIG. 1.

The drawings show the instrumentation for vehicle, and in the instrumentation for vehicle shown in FIG. 1 and FIG. 2, a fuel level meter 2, a speedometer 3, a tachometer 4, and a water temperature meter 5 are disposed in a meter hood 1 made of synthetic resin, in the lower part of the fuel level meter 2, moreover, one lamp unit 9 comprising a fuel level warning lamp, an exhaust temperature lamp 7, and an overdrive on/off lamp 8 is disposed, and in the lower part of the water temperature meter 5, other lamp unit 14 comprising an oil warning lamp 10, a seat belt lamp 11, a loose door warning lamp 12, and an electric system warning lamp 13 for battery, alternator, and others is disposed.

In the lower region of the speedometer 3, an odometer 15 and a trip meter 16 are disposed, and in the lower region of the tachometer 4, a digital clock 17 is disposed. Reference numeral 18 is a trip meter reset button, and 19 is a time set button.

At the front opening of the meter hood 1 incorporating these elements 2 to 19, a cover 22 made of a synthetic resin cover main body 20 and a transparent plate 21 is detachably provided to protect needle members 23, 24, 25, 26 of the meters 2 to 5.

The cover main body 20 has openings 31, 32, 33, 34 so that the needle members 23 to 26 and graduations of their scale plates 27, 28, 29, 30 may be visually recognized.

Figure 3:
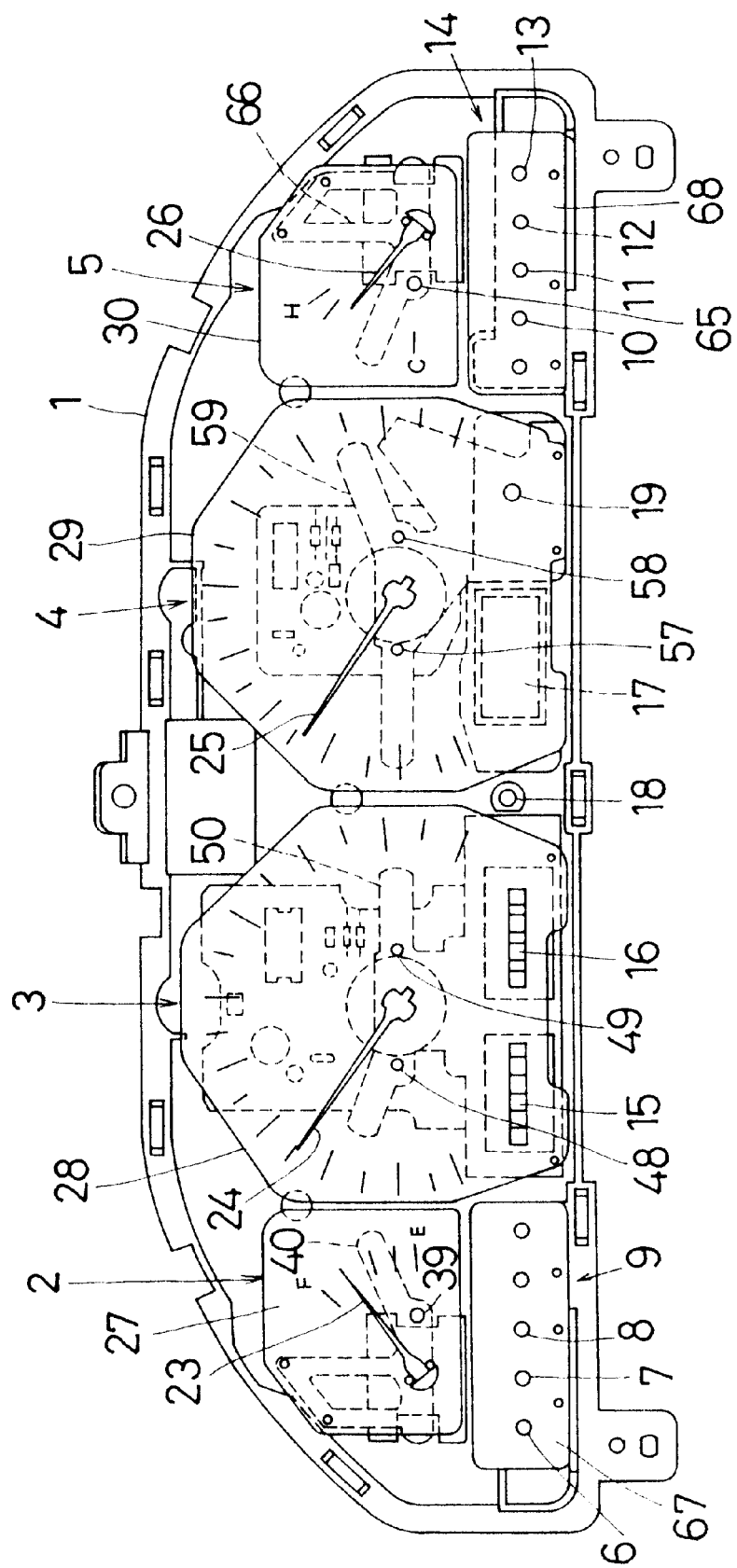
FIG. 3 is a front view of an instrumentation for vehicle shown with the cover removed.
Figure 4:
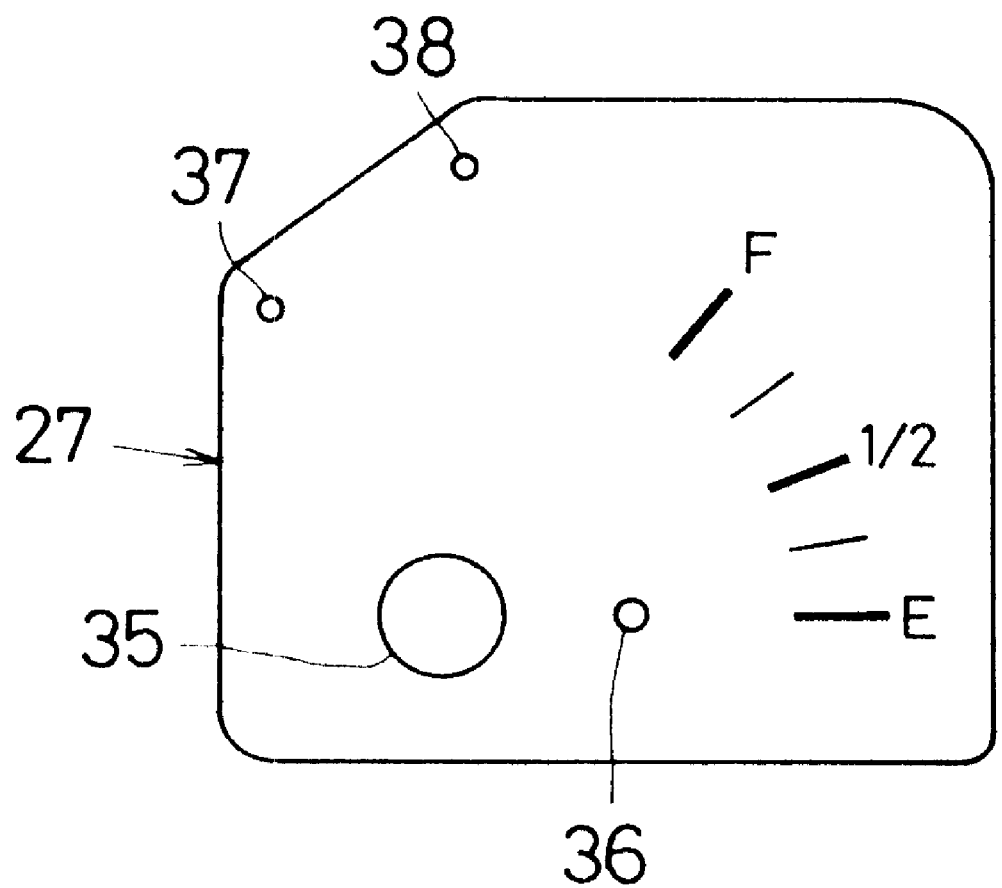
FIG. 4 is a front view of a scale plate for fuel level meter.

The scale plate 27 of the fuel level meter 2 has, as shown in FIG. 3 and FIG. 4, an opening 35 positioned at the fulcrum of rotation of the needle member 23, a screw hole 36, and two stopping holes 37, 38, and it is designed to be attached and detached in a holder 40 immediately beneath the scale plate 27 by attaching and detaching the needle member 23 and screw 39.

Figure 5:
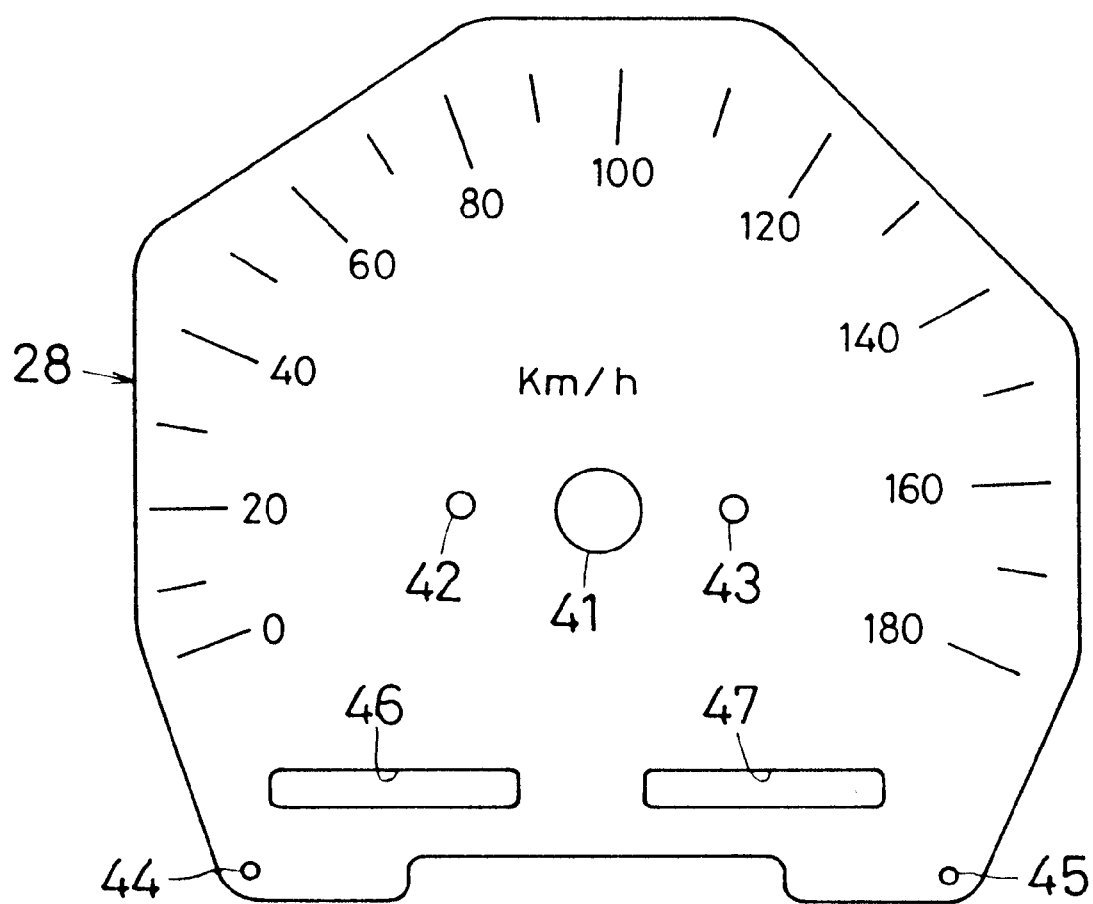
FIG. 5 is a front view of a scale plate for speedometer.

The scale plate 28 of the speedometer 3 has, as shown in FIG. 3 and FIG. 5, an opening 41 positioned at the fulcrum of rotation of the needle member 24, screw holes 42, 43, stopping holes 44, 45, an opening 46 for odometer, and an opening 47 for trip meter 16, and it is designed to be attached and detached in a holder 50 immediately beneath the scale plate 28 by attaching and detaching the needle member 24 and screws 48, 49. When the scale plate 28 is made of transparent or translucent member, meanwhile, instead of the openings 46, 47, unopened marking means may be used, and in such a case, therefore, the forming process of openings 46, 47 may be omitted.

Figure 6:
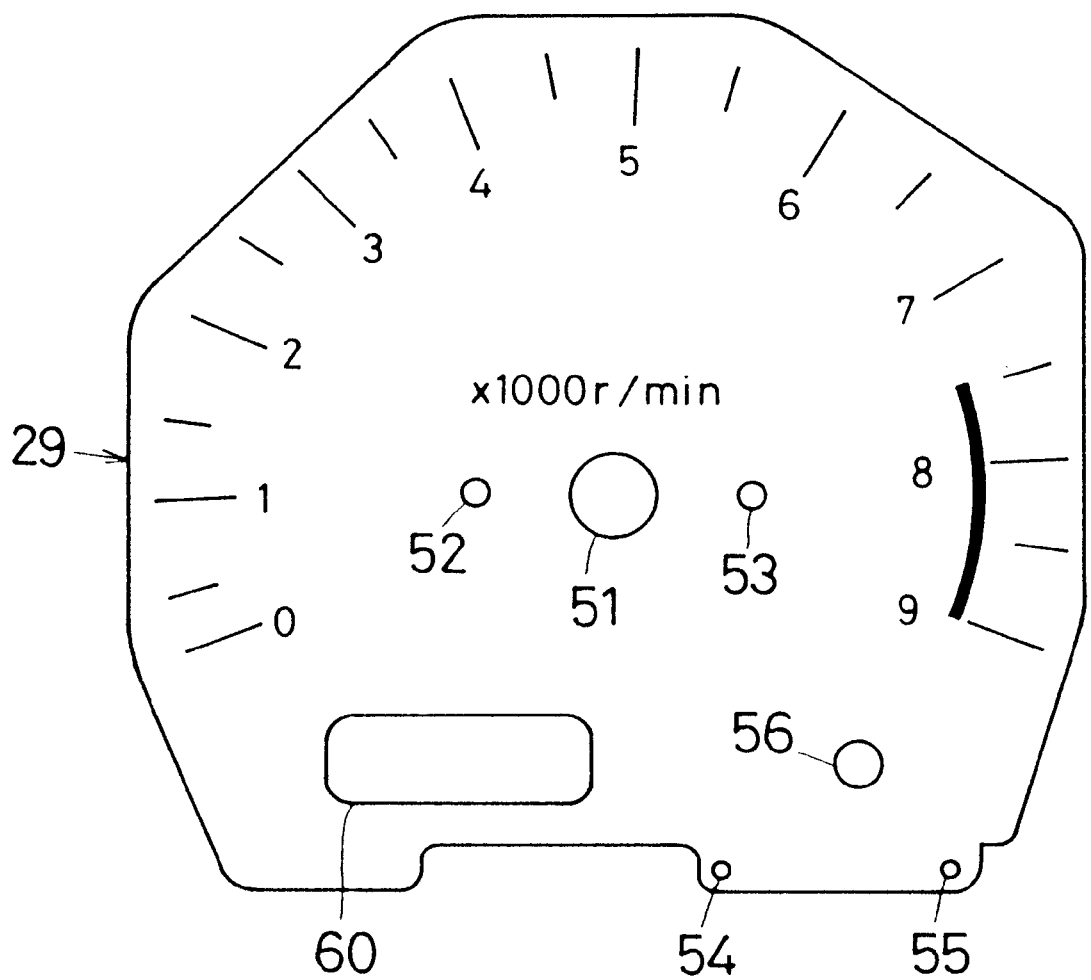
FIG. 6 is a front view of a scale plate for tachometer.

The scale plate 29 of the tachometer 4 has, as shown in FIG. 3 and FIG. 6, an opening 51 positioned at the fulcrum of rotation of the needle member 25, screw holes 52, 53, stopping holes 54, 55, and a time setting button insertion hole 55, and it is designed to be attached and detached in a holder 59 immediately beneath the scale plate 29 by attaching and detaching the needle member 25 and screws 57, 58. In FIG. 6, reference numeral 60 is a mark corresponding to the digital clock 17, and when this scale plate 29 is formed of an opaque material, the mark 60 is set in the opening, and when the scale plate 29 is formed of transparent or translucent material, the mark 60 is set in marking means (or opening). When this mark 60 is formed by marking means by printing or the like, the piercing process of the opening can be omitted.

Figure 7:
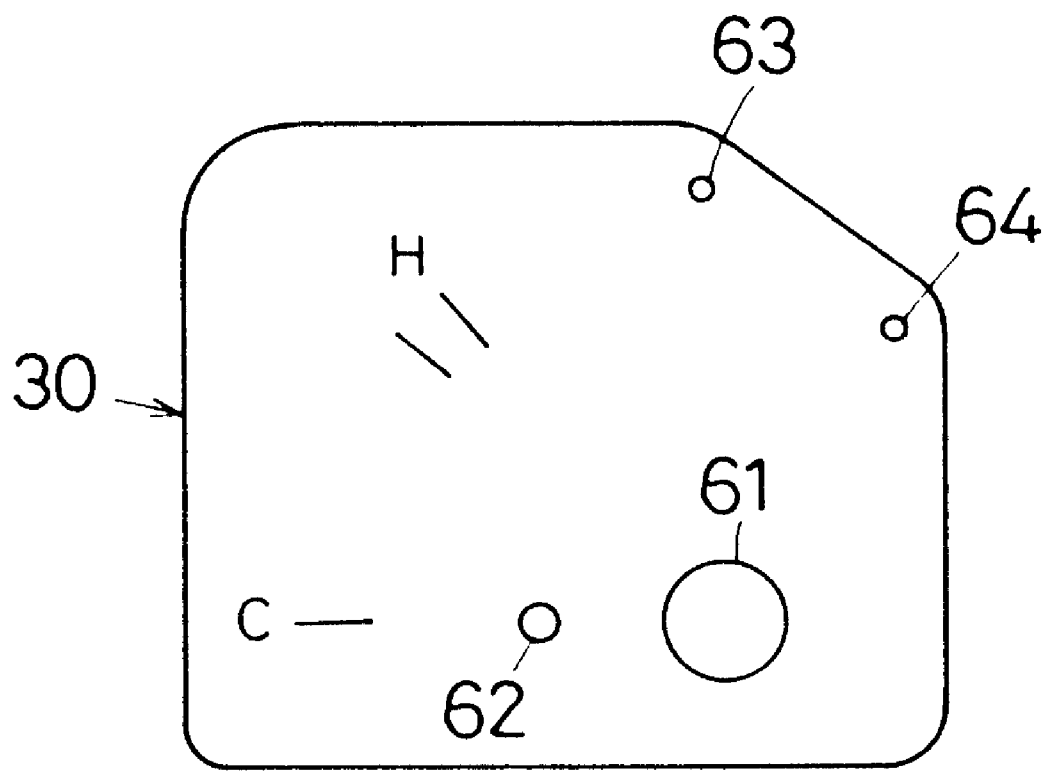
FIG. 7 is a front view of a scale plate for water temperature meter.

The scale plate 30 of the water temperature meter 5 has, as shown in FIG. 3 and FIG. 7, an opening 61 positioned at the fulcrum of rotation of the needle member 26, a screw hole 62, and stopping holes 63, 64, and it is designed to be attached and detached in a holder 66 immediately beneath the scale plate 30 by attaching and detaching the needle member 26 and screw 65. Herein, the stopping holes 37, 38, 44, 45, 54, 55, 63, 64 are detachably stopped on stopping pins integrally formed in the corresponding positions of the holders 40, 50, 59, 66.

Moreover, the scale plates 27, 28, 29, 30 are individually formed of opaque, colorless transparent, colored transparent, and translucent materials, and arbitrary scale plates corresponding to the needs of the driver are provided selectively and exchangeably. When the scale plates 27 to 30 are formed of transparent or translucent material, they may be formed in colorless, red, yellow, blue, green or other colors (for example, brown, violet, orange, pink, etc.), and as these materials, for example, synthetic resin such as vinyl chloride may be used.

In the embodiment in FIG. 3, colorless transparent, colored transparent or translucent material is selected in all of scale plates 27, 28, 29, 30, but colorless transparent, colored transparent or translucent material may be selected in some of the scale plates.

Moreover, all of the scale plates 27 to 30 may be formed of colored transparent material (or translucent material) of same or similar color, or may be formed o colored transparent material (or translucent material) of different color or dissimilar color, and in such constitution, the degree of freedom of selection of scale plates 27 to 30 is widely extended depending on the needs of the driver, and the combination of the scale plates 27 to 30 may be widely diversified.

In FIG. 3, reference numerals 67, 68 are lamp covers disposed detachably on the surface of lamp units 9, 14 disclosed closely to the instruments, and these lamp covers 67, 68 are, same as the scale plates 27 to 30, also attached selectively and exchangeably as being selected from opaque, colorless transparent, colored transparent, and translucent material.

Further in FIG. 2, reference numeral 69 is a neon tube as an example of electric decorative means disposed by effectively utilizing the extra space between the cover main body 20 and meter hood 1, and by illuminating this neon tube 69, a sufficient electric decorative effect of the instrumentation of vehicle may be maintained. The layout pattern of the neon tube 69 may be arbitrarily selected.

Thus, according to the instrumentation for vehicle of the foregoing embodiments, since at least one scale plate of the scale plates 27, 28, 29, 30 of the plural instruments (for example, fuel level meter 2, speedometer 3, tachometer 4, and water temperature meter 5) is made of transparent or translucent material, it is effective for inspecting the internal structure of the instrument through the scale plate (for example, capacitor, resistor, diode, IC chip, other electronic component, printed circuit board, etc.), visually recognizing the working state, deterioration or heat generation of the internal structure of the instrument, finding out easily the defective point in case of trouble of the instrument, improving the design remarkably, enhancing the countermeasure to prevent reversing of meter (prevent illegal alteration), and evoking the driving sense of driving a high-tech vehicle for the driver.

Moreover, at least one scale plate of the scale plates 27 to 30 of plural instruments is composed of opaque, transparent or translucent material selectively, it is hence capable of arbitrarily exchanging selectively these scale plates according to the needs of the driver, enhancing the degree of freedom of selection of scale plates, and diversifying their combinations.

In particular, when a transparent or translucent scale plate is selected, since the internal structure of the instrument (for example, capacitor, resistor, diode, IC chip, other electronic components and printed circuit board or winding, etc.) can be inspected through the scale plate, it is possible to visually recognize the working state, deterioration or heat generation of the internal structure of the instrument, and find out easily the defective point in case of trouble of the instrument.

Still more, plural transparent or translucent scale plates in various colors are provided and a scale plate of a specific color by selecting from these color scale plates can be selected, and hence it is capable of changing the color of the scale plate depending on the sense, taste or needs of the driver.

Besides, the lamp covers 67, 68 are made of transparent or translucent material, and hence it is capable of visually recognizing the internal structure of lamp cover from outside, and improving the design.

In addition, by making an effective use of the extra space between the cover main body 20 and meter hood 1, the neon tube 69 is disposed so that the tube itself cannot be seen from the driver's seat side, and by this luminous electric decorative means, the instrumentation for vehicle has enough electric decorative effects, and the neon tube 69 may be selected from various colors depending on the needs, so that the instrumentation for vehicle of the invention is particularly effective for sports car and RV (recreational vehicle).

In correspondence between the constitution of the invention and the embodiments, the instruments of the invention correspond to the fuel level meter 2, speedometer 3, tachometer 4 and water temperature meter 5 of the embodiments, and similarly, the luminous decorative means, to the neon tube 69, but the invention is not limited to the illustrated embodiments alone.

That is, the instruments used in the instrumentation for vehicle of the invention are plural instruments selected, depending on the model and grade of the vehicle, from the tachometer, speedometer, oil pressure gauge, fuel meter, turbo boost meter, water temperature meter, odometer, trip meter, etc., and the layout of these instruments is free, and the instrumentation for vehicle of the invention is applicable to all of them.

What is claimed is:

1. In a vehicle display instrument comprising:

a flat planar scale plate comprising a substrate and a plurality of scale indicators on a face of said substrate;

a needle movably disposed in front of said face of said face of said substrate of said scale plate to point to different scale indicators; and a see through cover plate covering said scale plate and said needle to enable an operator to observe the scale indicators to which said needle is selectively positioned; the improvement comprising:

said scale indicators being made of an opaque material and covering only a small surface of said face of said substrate; and said substrate of said scale plate consisting of a transparent or transluscent material with the entire surface thereof being transparent or transluscent except for the areas covered by said plurality of scale indicators so that said operator can observe the space behind said scale plate.

2. The instrument of claim 1, wherein said material is colored.

3. The instrument of claim 1, wherein said material is colorless.

4. The instrument of claim 1, wherein said material is made of vinyl chloride.

5. The instrument of claim 1, wherein said scale plate has said scale indicators made of a material which is different from that of said face thereof.

6. The instrument of claim 1, further comprising a lamp cover disposed on said face of said scale plate and being made of a transparent or transluscent material.

7. The instrument of claim 1, further comprising a luminous decorative pattern disposed on said face of said scale plate.

8. In a vehicle instrument panel comprising a plurality of instrument display devices, each device comprising:

a flat planar scale plate comprising a substrate and a plurality of scale indicators disposed on a face of said substrate;

a needle movably disposed in front of said face of said scale plate to point to different scale indicators; and a see through cover plate covering said scale plate and said needle to enable an operator to observe the scale indicators to which said needle is selectively positioned; the improvement comprising:

said scale indicator being of an opaque material covering only a small part of said face of said substrate; and said substrate of said scale plate of each different device consisting of and being selectively made of the same or different colorless transparent, colored transparent or transluscent material; wherein the entire surface thereof is transparent or transluscent except for areas covered by said scale indicators so that said operator can observe the space behind the scale plate.

\* \* \* \* \*